United States Patent Office 3,343,065
Patented Sept. 19, 1967

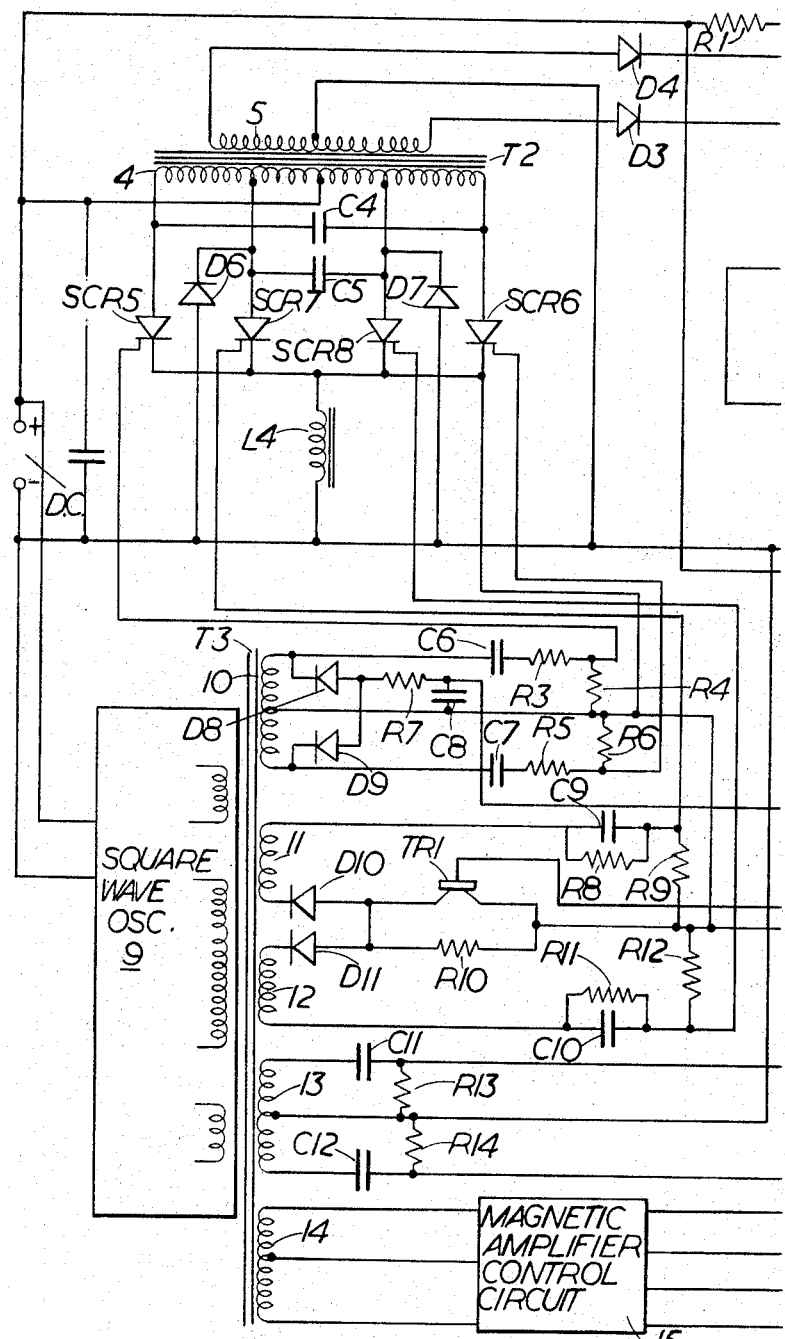
FIG. IA

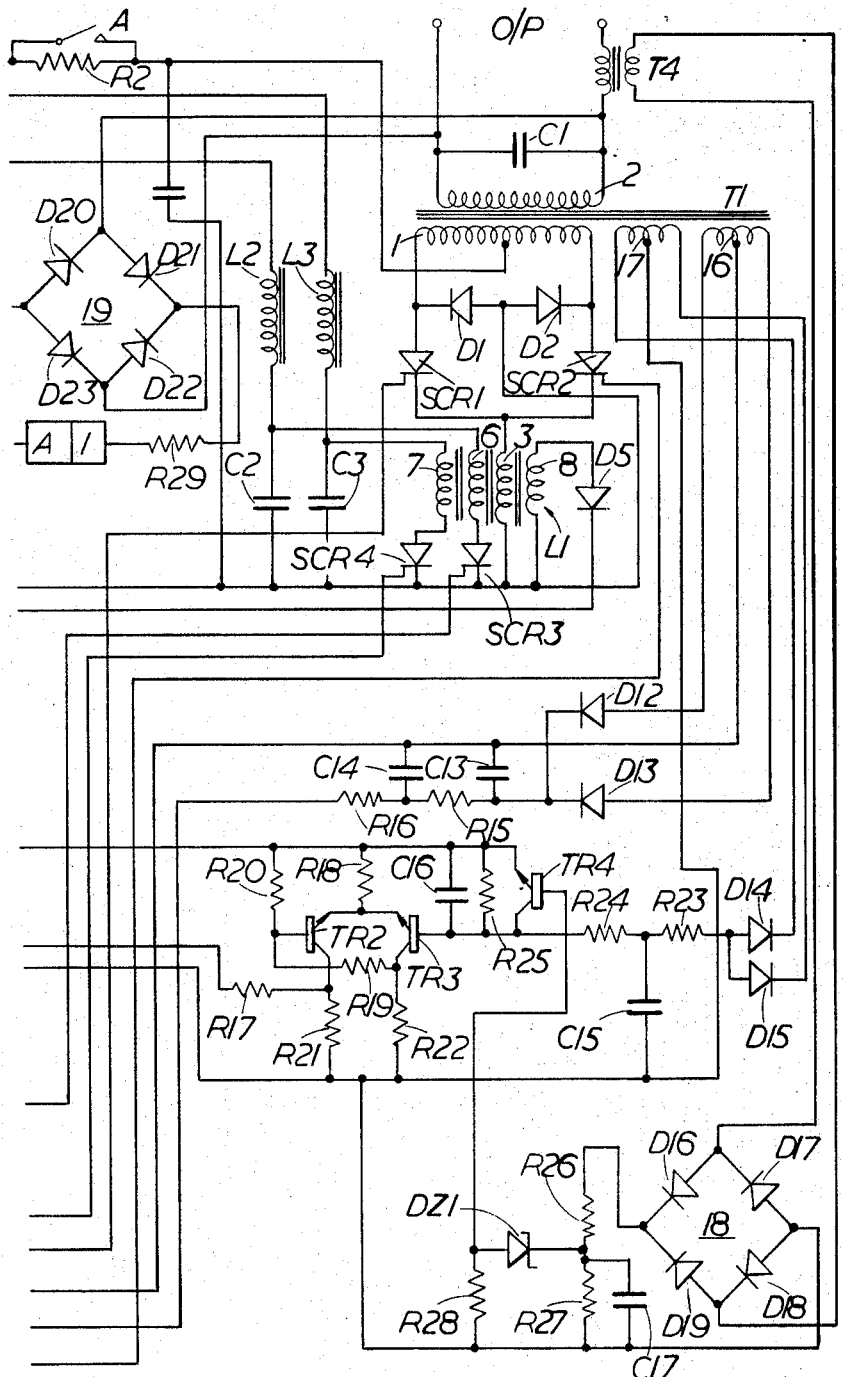
FIG. IB

3,343,065
INVERTER CIRCUIT WITH COMMUTATION MEANS INDEPENDENT OF THE LOAD CIRCUIT
Keith William Gurnett, Bracknell, England, assignor to Ferranti, Limited, Hollinwood, England, a company of the United Kingdom of Great Britain and Northern Ireland
Filed May 19, 1964, Ser. No. 368,497
Claims priority, application Great Britain, May 21, 1963, 20,075/63
13 Claims. (Cl. 321—18)

ABSTRACT OF THE DISCLOSURE

An inverter circuit in which commutation is carried out by means independent of the load circuit. To this end, the inverter circuit includes a first transformer having connected thereto a pair of switching devices for controlling the flow of D.C. through the primary winding. The switching devices are controlled by commutating capacitors which are charged from a second transformer to a level determined by the output current of the inverter. The second transformer provides a source of current for the capacitors that is independent of the current flowing in the primary winding of first transformer and has the effective turns ratio of its primary and secondary windings controlled in response to the output current of the inverter.

---

Inverters are now known which include a transformer and a primary circuit having first and second switching devices for controlling the flow of D.C. through the primary winding of the transformer.

In the operation of such inverters difficulties sometimes arise in commutating between the first and second switching devices, especially when a short circuit occurs on the output side of the inverter causing a large current to flow in the primary circuit. This is particularly disadvantageous when the inverter is required to supply A.C. to a number of independent output circuits, since a short circuit on any one output circuit may cause the commutation of the inverter, and therefore the supply of A.C. to the remaining circuits, to be interrupted. For this reason, it is usual to provide a separate inverter for each output circuit where extreme reliability is required.

It is an object of the present invention to provide an inverter in which a short circuit on the output side does not cause an interruption in the commutation of the inverter.

According to the present invention an inverter includes a transformer, a primary circuit including first and second switching devices for controlling the flow of D.C. through the primary winding of said transformer, and commutating means for changing the condition of said first and second switching devices from the ON to the OFF condition, said commutating means including capacitor means, means independent of said primary circuit for charging said capacitor means to a level determined by the output current of said inverter, and means for causing said capacitor means to discharge in opposition to current flowing in said primary circuit.

Said means for charging said capacitor means may include a further transformer having a tapped winding and means responsive to the output current of said inverter for changing the effective turns ratio of the primary and secondary windings of said further transformer.

Said inverter may further include means for limiting the current flowing in said primary circuit when a short circuit occurs on the output side of said inverter.

The present invention will now be described by way of example with reference to the accompanying drawings which, when the right edge of FIG. 1A is joined to the left edge of FIG. 1B, show a circuit diagram of an inverter in accordance with the invention.

Referring now to the drawings, the inverter shown includes a transformer T1 having a centre-tapped primary winding 1 and a secondary winding 2 tuned by a capacitor C1. The two ends of the primary winding 1 are connected via silicon controlled rectifiers SCR1, SCR2 to one end of one winding 3 of a choke L1, the other end of the winding 3 being connected to the negative pole of a D.C. source which is also connected to the ends of the winding 1 via diodes D1, D2. The positive pole of the D.C. source is connected via two series connected resistors R1, R2 to the centre tap of the winding 1.

A further transformer T2 has a tapped primary winding 4 and a secondary winding 5 having a centre tap which is connected to the negative pole of the D.C. source. One end of the winding 5 is connected via a diode D3 to one end of an inductance L2 the other end of which is connected via a capacitor C2 to the negative pole of the D.C. source. The junction between the inductance L2 and the capacitor C2 is connected to one end of a winding 6 on the choke L1, the other end of which is connected via a silicon controlled rectifier SCR3 to the negative pole of the D.C. source. Similarly, the other end of the winding 5 is connected via a diode D4 to one end of an inductance L3 the other end of which is connected via a capacitor C3 to the negative pole of the D.C. source. The junction between the inductance L3 and the capacitor C3 is connected to one end of a winding 7 on the choke L1, the other end of which is connected via a silicon controlled rectifier SCR4 to the negative pole of the D.C. source. The choke L1 has a further winding 8 which has one end connected to the negative pole of the D.C. source and the other end connected via an overswing diode D5 to the positive pole of the D.C. source.

The two ends and two balanced taps of the primary winding 4 of the transformer T2 are connected via silicon controlled rectifiers SCR5, SCR6, SCR7 and SCR8 and a common choke L4 to the negative pole of the D.C. source, a centre tap on the winding 4 being connected to the positive pole. A capacitor C4 is connected between the ends of the winding 4, and a capacitor C5 is connected between the balanced taps of the winding 4 which are also connected via diodes D6 and D7 to the negative pole of the D.C. source.

The trigger electrodes of the controlled rectifiers SCR1 . . . SCR8 are connected to a trigger control source comprising a square wave oscillator 9 of known form which includes a saturable core transformer T3 having five output windings 10, 11, 12, 13 and 14. The winding 10 has a centre tap which is connected via the choke L4 to the negative pole of the D.C. source and the two ends of the winding 10 are connected via differentiating networks comprising capacitors C6, C7 and resistors R3, R4, R5 and R6 to the trigger electrodes of the rectifiers SCR5 and SCR6. A negative D.C. supply for a part of the circuit to be described later is also obtained from the winding 10 by means of a full wave rectifier circuit comprising diodes D8, D9, resistor R7 and capacitor C8.

The winding 11 of the transformer T3 has one end conected via a differentiating network comprising a capacitor C9 and resistors R8 and R9 to the trigger electrode of the rectifier SCR7. The other end of the winding 11 is connected via a diode D10, a resistor R10 and the choke L4 to the negative pole of the D.C. source. Similarly the winding 12 has one end connected via a differentiating network comprising a capacitor C10 and resistors R11 and R12 to the trigger electrode of the rectifier SCR8, the other end of the winding 12 being connected via a diode D11, the resistor R10 and the choke L4 to the negative pole of the D.C. source.

The winding 13 of the transformer T3 has a centre tap which is connected to the negative pole of the D.C. source and the two ends of the winding 13 are connected via differentiating networks comprising capacitors C11, C12 and resistors R13, R14 to the trigger electrodes of the rectifiers SCR3 and SCR4. The two ends of the winding 14 are connected to the trigger electrodes of the rectifiers SCR1 and SCR2 via a magnetic amplifier control circuit 15 of known kind, the control current for the magnetic amplifier (not shown) being derived from a winding 16 on the transformer T1 and a full wave rectifier circuit comprising diodes D12, D13, capacitors C13, C14 and resistors R15, R16.

A PNP transistor TR1 is connected with its emitter-collector path in parallel with the resistor R10 common to the windings 11 and 12. The base of the transistor TR1 is connected via a resistor R17 to the collector of an NPN transistor TR2 the emitter of which is connected to the emitter of an NPN transistor TR3 and via a resistor R18 to the negative D.C. supply line from the winding 10 of the transformer T3. The base of the transistor TR2 is connected via a resistor R19 to the collector of the transistor TR3 and also via a resistor R20 to the negative D.C. supply line, and the collectors of the transistors TR2, TR3 are connected via resistors R21, R22 and the choke L4 to the negative pole of the D.C. source. A winding 17 on the transformer T1 has a centre tap which is connected via the choke L4 to the negative pole of the D.C. source and the two ends of the winding 17 are connected to a full wave rectifier comprising diodes D14, D15, resistors R23, R24 and a capacitor C15, the output of the rectifier being connected to the base of the transistor TR3. A capacitor C16 and a resistor R25 are connected in parallel between the base of the transistor TR3 and the negative supply line from the winding 10 on the transformer T3.

The output of the inverter is taken from the winding 2 of the transformer T1 via the primary winding of a current transformer T4, the secondary winding of which is connected to the input of a bridge rectifier 18 comprising diodes D16, D17, D18 and D19. A potential divider comprising resistors R26, R27 is connected across the output of the bridge rectifier 18, one side of the output being connected to the negative pole of the D.C. source via the choke L4. A capacitor C17 is connected in parallel with the resistor R27 and the junction between the resistors R26 and R27 is connected via a Zener diode DZ1 to the base of a transistor TR4 having its emitter-collector path connected in parallel with the resistor R25. The base of the transistor TR4 is also connected via a resistor R28 and the choke L4 to the negative pole of the D.C. source.

A further bridge rectifier 19 comprising diodes D20, D21, D22 and D23 is connected across the output winding 2 of the transformer T1, the output of the bridge rectifier 19 being connected via a resistor R29 to a relay A having a single contact A1 connected in parallel with the resistor R2.

During normal operation of the inverter the output voltage is rectified by the bridge rectifier 19 and energises the relay A which closes the contact A1 to short out the resistor R2. The current derived from the current transformer T4 is rectified by the bridge rectifier 18 and produces a voltage at the junction of the resistors R26 and R27 which is insufficient to cause breakdown of the Zener diode DZ1 and the voltage on the base of the transistor TR4 is then such that the transistor TR4 is cut off. Also, the output voltage developed across the winding 17 of the transformer T1 is rectified and applied to the base of the transistor TR3 causing it to conduct and the transistor TR2 is therefore cut off due to the voltage drop across the resistor R22. With the transistor TR2 cut off the voltage on the base of the transistor TR1 is such that it also is cut off and the resistor R10 is therefore included in the trigger circuit for the rectifiers SCR7 and SCR8. The inclusion of the resistor R10 ensures that the trigger pulses are of insufficient amplitude to cause the rectifiers SCR7 and SCR8 to fire.

Under these conditions the operation of the inverter is as follows. A trigger impulse from the winding 14 on the transformer T3 is applied via the magnetic amplifier control circuit 15 to cause the rectifier SCR1 to fire. Trigger impulses are also applied from the windings 10 and 11 to the rectifiers SCR5 and SCR7 but, as previously stated, that applied to the rectifier SCR7 is of insufficient amplitude to cause it to fire. The rectifier SCR5 therefore fires and the whole of the left hand half of the winding 4 rings up positively. A positive going pulse is therefore applied via the diode D4 to the tuned circuit comprising the inductance L3 and capacitor C3 causing it to ring and charge the capacitor C3 positively.

At the end of the half cycle of the square wave oscillator, assuming that no delay is introduced by the magnetic amplifier control circuit, trigger impulses are applied simultaneously to the rectifiers SCR2, SCR4, SCR6 and SCR8, that applied to the rectifier SCR8, however, being of insufficient amplitude to cause it to fire, as previously stated. As the rectifier SCR4 fires the capacitor C3 discharges through the winding 7 on the choke L1 causing the current in the winding 3 momentarily to drop to zero thereby changing the rectifier SCR1 from its ON to its OFF condition. At the same time the rectifier SCR6 fires and the right hand half of the winding 4 of the transformer T2 rings up positively, the capacitor C4 being discharged to change the rectifier SCR5 from its ON to its OFF condition in known manner. A positive going pulse is therefore applied via the diode D3 to the tuned circuit comprising the inductance L2 and the capacitor C2 causing it to ring up and charge the capacitor C2 positively.

At the end of the half cycle trigger impulses are applied to the rectifiers SCR1, SCR3, SCR5 and SCR7 causing the capacitor C2 to discharge through the winding 6 of the choke L1. The current through the winding 3 therefore momentarily drops to zero and the rectifier SCR2 is changed from its ON to its OFF condition. The capacitor C3 is then again charged positively via the diode D4. The diodes D6 and D7 allow current to flow in the reverse direction to normal inversion this being required due to the nature of the load imposed by the inductances L2 and L3 and the capacitors C2 and C3.

If a reduced power output from the inverter is required the magnetic amplifier control circuit 15 is operated to delay the triggering of the rectifiers SCR1 and SCR2 at the start of each half cycle in known manner. When the rectifier SCR3 or SCR4 is triggered at the start of each half cycle the capacitor C2 or C3 is discharged as described above to change the rectifier SCR2 or SCR1 to its OFF condition. During the delay until the rectifier SCR1 or SCR2 is triggered to change it to its ON condition the winding 8 on the choke L1 rings up positively and causes the overswing diode D5 to conduct. By this means current through the choke L1 is maintained during the delay at the start of each half cycle thereby permitting full current to flow when the rectifier SCR1 or SCR2 is triggered and changed to its ON condition.

If a short circuit occurs on the output side of the inverter the voltage across the windings 2 and 17 of the transformer T1 drops almost to zero. Consequently, the collector potential of the transistor TR4 rises and the transistor TR4 therefore starts to conduct effectively shorting out the resistor R25 causing the transistor TR3 to cut off and the transistor TR2 to start conducting. When the transistor TR2 starts to conduct the potential drop which occurs across the resistor R21 causes the voltage on the base of the transistor TR1 to fall. The transistor TR1 therefore starts to conduct and effectively shorts out the resistor R10.

With the resistor R10 effectively shorted out the amplitude of the trigger impulses to the rectifiers SCR7 and SCR8 is no longer limited. Therefore, at the start of the next half cycle both of the rectifiers SCR5 and SCR7, say, are triggered to their ON condition. Due to transformer action, however, the end of the winding 4 to which the rectifier SCR5 is connected is driven to a negative voltage and the rectifier SCR5 is therefore immediately changed to its OFF condition leaving the rectifier SCR7 conducting. Consequently the effective turns ratio of the windings 4 and 5 is increased and therefore a pulse of greatly increased amplitude is passed via the diode D4 to the tuned circuit comprising the inductance L3 and the capacitor C3. The capacitor C3 is therefore charged to a higher level than during normal working conditions and when at the start of the next half cycle the rectifier SCR4 is triggered the increased current discharged through the winding 7 of the choke L1 is sufficient to cause commutation of the increased current flowing in the primary circuit due to the short circuit on the output side of the inverter. The rectifiers SCR6 and SCR8 are similarly triggered together at the same time as the rectifiers SCR2 and SCR4 are triggered and the capacitor C2 is therefore similarly charged to an increased level.

Since the output voltage across the winding 2 of the transformer T1 falls when a short circuit occurs on the output side of the inverter the output voltage from the bridge rectifier 19 also falls and the relay A becomes de-energised. The relay contact A1 therefore opens to insert the resistor R2 into the primary circuit and thereby limit the current flowing in the primary circuit to a level which can be commutated by the increased charge of the capacitors C2 and C3.

When the short circuit on the output side of the inverter is removed, e.g. by the operation of a protective device in the faulty circuit, the voltage across the windings 2 and 17 of the transformer T1 increases and the transistor TR3 starts to conduct cutting off the transistors TR2 and TR1. The resistor R10 is therefore again inserted in the trigger circuits for the rectifiers SCR7 and SCR8 thus limiting the amplitude of the trigger impulses to a value which is insufficient to cause the rectifiers SCR7 and SCR8 to fire. The level to which the capacitors C2 and C3 are charged therefore reverts to the level suitable for normal operation of the inverter.

At the same time the output from the bridge rectifier 19 increases to energise the relay A and close the contact A1 to short out the limiting resistor R2.

Similarly, if there is an abnormal increase in the output current of the inverter the current flowing through the transformer T4 is increased. As a result, the increased output current from the bridge rectifier 18 creates an increased potential at the junction of the resistors R26 and R27 which exceeds the breakdown potential of the Zener diode DZ1. Consequently the transistor TR4 starts to conduct cutting off the transistor TR3 and causing the transistors TR2 and TR1 to start conducting. The capacitors C2 and C3 are again charged to an increased level and the operation of the inverter is not interrupted by an abnormal increase in current such as may be caused by a current surge on the output side of the inverter.

If for any reason the commutation of the inverter should fail and both of the rectifiers SCR1 and SCR2 conduct at the same time the winding 1 of the transformer T1 becomes short circuited and the output voltage across the windings 2 and 17 becomes zero. The relay A is therefore operated to limit the current flowing in the primary circuit and the capacitors C2 and C3 are again charged to an increased level due to the drop in output voltage from the winding 17. Commutation is therefore restored upon the application of the next trigger impulse to the rectifier SCR3 or SCR4.

In order to ensure that the inverter does not continue to pass an increased current for too long a period of time a thermal cut-out (not shown) may be included in the supply lead from the D.C. source in known manner.

It will be seen from the above description that the source of current from which the commutating capacitors C2 and C3 are charged, i.e. the transformer T2, is independent of the current flowing in the primary circuit of the inverter transformer T1, but that the level to which the capacitors C2 and C3 are charged is determined by the output current and/or the output voltage of the inverter. By arranging that the level to which the capacitors C2 and C3 are charged is increased when the output current increases beyond a certain level or the output voltage drops below a certain level it is ensured that commutation will continue, even if a short circuit occurs on the output side of the inverter, without having to charge the capacitors to an excessive level during normal operation of the inverter. The inverter may therefore be used to supply several independent output circuits since if a short circuit occurs in any one of the output circuits the commutation of the inverter, and therefore the supply to the remaining circuits, will not be interrupted.

What I claim is:

1. An inverter including a transformer, a primary circuit including first and second switching devices for controlling the flow of D.C. through the primary winding of said transformer, and commutating means for changing the condition of said first and second switching devices from the ON to the OFF condition, said commutation means including capacitor means, a further transformer independent of said primary circuit for supplying current to said capacitor means for charging said capacitor means to a level determined by the output current of said inverter, said further transformer having a tapped winding, means responsive to the output current of said inverter for changing the effective turns ratio of the primary and secondary windings of said further transformer, and means for causing said capacitor to discharge in opposition to current flowing in said primary circuit.

2. An inverter as claimed in claim 1 in which said tapped winding has a centre tap and at least one pair of tapping points symmetrically disposed with respect to said centre tap, said centre tap being connected to one pole of a D.C. source and the remaining tapping points and and the ends of said tapped winding being connected to the other pole of said D.C. source by means of independent switching devices.

3. An inverter as claimed in claim 2 in which said independent switching devices are controlled rectifiers.

4. An inverter as claimed in claim 2 in which said means for changing the effective turns ratio of the primary and secondary windings of said further transformer include means for selectively operating said independent switching devices.

5. An inverter as claimed in claim 3 in which said means for changing the effective turns ratio of the primary and secondary windings of said further transformer include trigger pulse means for applying triggering pulses simultaneously to all of the controlled rectifiers connected to one half of said tapped winding, resistance means connected to the trigger electrodes of the controlled rectifiers connected to said tapping points and operative to limit said triggering pulses to prevent triggering of said controlled rectifiers, and switch means operative to short out said resistance means, said switch means being controlled in accordance with the output current of said inverter.

6. An inverter as claimed in claim 5 in which said switch means comprises a transistor having its emitter to collector path connected in parallel with said resistance means.

7. An inverter as claimed in claim 1 in which said primary circuit includes a choke having at least one additional winding through which said capacitor means are caused to discharge in opposition to current flowing in said primary circuit to change the condition of said first and second switching devices from the ON to the OFF condition.

8. An inverter as claimed in claim 7 in which said capacitor means includes first and second capacitors connected to first and second additional windings respectively on said choke, the discharge paths of said capacitors including controlled rectifiers which may be individually triggered to cause discharge of one or other of said capacitors.

9. An inverter as claimed in claim 1 including means for limiting the current flowing in said primary circuit when a short circuit occurs on the output side of said inverter.

10. An inverter as claimed in claim 9 in which said means for limiting the current flowing in said primary circuit include a resistance and a voltage operated relay having a set of contacts connected in parallel with said resistance, the operating coil of said relay being connected across the output of said inverter such that in operation said relay contacts are closed to short out said resistor unless the output voltage of said inverter falls to a low value which causes said relay contacts to open.

11. An inverter including a first transformer having an output winding and a centre-tapped primary winding the centre tap of which is connected to one pole of a D.C. source, first and second controlled rectifiers connected respectively to the two ends of said primary winding and via a first choke to the other pole of said D.C. source, a second transformer having a primary winding having a centre tap connected to said one pole of said D.C. source and first and second tapping points symmetrically disposed with respect to said centre tap, third and fourth controlled rectifiers connected respectively to the two ends of said primary winding of said second transformer and via a second choke to said other pole of said D.C. source fifth and sixth controlled rectifiers connected respectively to said first and second tapping points and to said other pole of said D.C. source via said second choke, a secondary winding on said second transformer having a centre tap connected to said other pole of said D.C. source, first and second capacitors connected respectively for charging between the two ends of said secondary winding of said second transformer and said other pole of said D.C. source, first and second additional windings on said first choke connected respectively to said first and second capacitors and via seventh and eighth controlled rectifiers to said other pole of said D.C. source to provide a discharge path for said capacitors, trigger pulse means for applying trigger pulses to said first controlled rectifier and to said third, fifth and seventh controlled rectifiers together to change the condition of said second controlled rectifier from the ON to the OFF condition or to said second controlled rectifier and to said fourth, sixth and eighth controlled rectifiers together to change the condition of said first controlled rectifier from the ON to the OFF condition, resistance means connected to the trigger electrodes of said fifth and sixth controlled rectifiers and operative to limit said triggering pulses to prevent triggering of said fifth and sixth controlled rectifiers, and switch means operative to short out said resistance means, said switch means being controlled in accordance with the output current of said inverter.

12. An inverter as claimed in claim 11 in which said switch means comprises a transistor having its emitter to collector path connected in parallel with said resistance means.

13. An inverter as claimed in claim 11 including means for limiting the current flowing in the primary winding of said first transformer when a short circuit occurs on the output side of said inverter.

References Cited
UNITED STATES PATENTS

| | | | |
|---|---|---|---|
| 2,289,437 | 4/1941 | Bedford. | |
| 3,103,616 | 9/1963 | Cole et al. | 321—45 |
| 3,151,287 | 1/1964 | Pintell | 321—45 |
| 3,219,906 | 11/1965 | Keller et al. | 321—16 |
| 3,273,046 | 9/1966 | Bedford | 321—45 |

JOHN F. COUCH, *Primary Examiner.*

W. M. SHOOP, JR., *Assistant Examiner.*